Patented May 19, 1953

2,639,281

UNITED STATES PATENT OFFICE 2,639,281

MANUFACTURE OF CARBOXYMETHYL CELLULOSE

Arthur Hodge, James Gordon Napier Drewitt, and John Downing, Spondon, near Derby, England, assignors to British Celanese Limited, a corporation of Great Britain No Drawing. Application September 20, 1950, Serial No. 185,906. In Great Britain October 5, 1949

21 Claims. (Cl. 260—231)

This invention relates to the manufacture of carboxymethyl cellulose.

In accordance with the common practice the term "carboxymethyl cellulose" is employed in the present specification to include the sodium salt, in which form the compound is normally obtained and used. References to solubility, viscosity and other properties are to be taken as relating to the sodium salt. If the free acid is required it can easily be obtained by treating the sodium salt with an acid, e. g. hydrochloric acid.

It is known that carboxymethyl cellulose can be made by mixing chloracetic acid or sodium chloracetate with alkali cellulose and milling the mixture, e. g. in a Werner-Pfleiderer mixer. The constitution and properties of carboxymethyl celluloses so obtained, e. g. their degree of substitution, solubility, viscosity and homogeneity, may vary widely, and their commercial utility and value are likewise variable. Moreover the amounts of alkali and chloracetic acid or sodium chloracetate employed exceed by a considerable proportion the amounts theoretically required, so increasing the cost of the carboxymethyl cellulose.

It is an object of the present invention to provide novel conditions for the manufacture of carboxymethyl cellulose which shall reliably give a water-soluble product having a satisfactory degree of homogeneity and which at the same time shall be economical with respect to the amount of alkali and carboxymethylating agent employed.

According to the invention, cellulose is impregnated with caustic soda by immersing it in a caustic soda solution of concentration 15–33%, and preferably 18–30%, at a temperature above 50° C., the impregnated cellulose is subjected to pressure until the molecular ratio of caustic soda to cellulose (as determined by analysis) is between 2.0 and 3.1, chloracetic acid or sodium chloracetate is mixed with the alkali cellulose so obtained, and the mixture is milled at a temperature kept below 25° C. Advantageously, the temperature of the caustic soda solution in which the cellulose is immersed is above 65° C. and especially between 75° and 85° C.

In a preferred method, the cellulose is immersed in a caustic soda solution of concentration 21–26%, and the impregnated cellulose is subjected to a low pressure only (i. e. a pressure below about 75 p. s. i. g.) and especially to a pressure of about 40–50 p. s. i. g., until the molecular ratio of the caustic soda to the cellulose has been reduced to between 2.0 and 2.5 and especially between 2.0 and 2.3. Chloracetic acid is mixed with the alkali cellulose so obtained, and the mixture is milled at a temperature which initially and for at least the greater part of the milling time is between 10° and 20° C.

By employing the conditions set out above, it is possible to make use of as little as 0.75 or 0.65 molecular proportions of chloracetic acid for each molecular proportion of cellulose (reckoned as $C_6H_{10}O_5$) and still obtain a homogeneous water-soluble product, though larger amounts, e. g. up to 1.0 or 1.25 molecular proportions, may be used if desired. Although on being mixed with the alkali cellulose chloracetic acid will be neutralised to sodium chloracetate, and although sodium chloracetate is commonly regarded as being equivalent to chloracetic acid in the manufacture of carboxymethyl cellulose, the use of the sodium salt is in the process of the present invention less desirable than the use of the free acid.

A further condition which we have found it most advantageous to observe is that the amount of caustic soda in the alkali cellulose should not exceed 1.5 times the equivalent of the amount of chloracetic acid to be employed (taking into account both the carboxyl group and the chlorine atom); in other words the molecular ratio of the caustic soda to the chloracetic acid should not exceed 3:1. It will be noted that it is only possible to make use of a corresponding ratio (i. e. less than 1.5 times the equivalent) with sodium chloracetate, without going outside the conditions characterising the invention and set out above, by the use of an excessive quantity of the carboxymethylating agent; it has already been pointed out that in actual practice it has been found preferable to use free chloracetic acid.

It will be noted that the molecular ratio of alkali to cellulose is expressed in terms of the analytical ratio and not primarily in terms of the "wet/dry" ratio usually employed. We have found that the wet/dry ratio does not give a general measurement of the ratio of alkali to cellulose which is certain enough for the present purpose, partly because some alkali is taken up by the cellulose from the solution and partly because some part of the cellulose usually dissolves in the alkali solution. Both these effects operate in the same direction, namely to increase the true ratio of alkali to cellulose over the value calculated from the wet/dry ratio. For a given cellulose and given conditions of impregnation and pressing (including concentration and temperature of the alkali solution) the relationship between the true ratio and the wet/dry ratio is sufficiently nearly constant to permit further batches being run without every time performing the analysis. The analytical ratio is expressed in terms of the molecular ratio of alkali, whether free or in some sense combined with the cellulose, to cellulose reckoned as $C_6H_{10}O_5$.

The alkali cellulose is preferably made by immersing cellulose, e. g. wood pulp in sheet form, in the caustic soda solution under the specified conditions for a considerable time, e. g. between about 30 minutes and 1 or 1½ hours or more, and then squeezing the cellulose, for example by means of a ram operating against a large number of impregnated sheets. Advantageously the cellulose may be impregnated and pressed in one and the same vessel in the known manner. If desired, however, the alkali cellulose may be made by feeding the cellulose in sheet form continuously first through a bath of the caustic soda solution, and then through one or more pairs of squeeze rollers.

After being pressed, and before being charged into the mill, the alkali cellulose is if necessary broken up into small pieces. This may be done for example in a Bridge Banbury mixing machine or the like, or in a hammer mill. Unless a very high viscosity product is desired, it is usually preferable to mill the alkali cellulose, e. g. in the mill to be used in the carboxymethylation, for a period before adding the chloracetic acid or sodium chloracetate. For example, if a product of moderate viscosity is required, the alkali cellulose may be milled for 1 to 2 hours at a temperature below about 25° C.; if a very low viscosity product, as for use as a size, is required the alkali cellulose may be milled for about 5 to 6 hours, e. g. at 40°–55° C.

The carboxymethylation reaction is preferably carried out in a mixer of the Werner-Pfleiderer type, which may advantageously be lined with stainless steel and provided with stainless steel blades and which is also provided with a jacket for the passage of chilled brine or some other cooling liquid. The alkali cellulose may be introduced first, followed by the chloracetic acid or sodium chloracetate, usually after an interval of 1 or 2 hours or longer in accordance with the viscosity desired in the product as indicated above. Even though, as already explained, quite small amounts of the chloracetic acid or sodium chloracetate suffice to give a satisfactory product, it is advisable to add the chloracetic acid or sodium chloracetate in stages as the reaction proceeds, e. g. in 3–6 stages at intervals of ½–2 hours.

Milling is preferably continued for a considerable time, e. g. for 3–6 hours after the last of the chloracetic acid or sodium chloracetate has been added; generally speaking a total milling time of 8–15 hours, and especially 10–12 hours, from the first addition of chloracetic acid or sodium chloracetate is adequate. After this the product may be discharged from the mill or mixer and preferably is either allowed to stand for a further period of, for example, about 60–150 hours or more, or is tumbled or otherwise kept in comparatively gentle motion, for instance for about 15–50 hours. In this operation also the temperature is preferably kept low, advantageously below 25° C. throughout the mass.

Carboxymethyl cellulose produced by the new process can be purified as may be desired, having regard to the purposes for which it is to be used. Thus if the presence of salts in the carboxymethyl cellulose is no disadvantage, it may be sufficient to neutralise any remaining caustic soda, e. g. by means of carbon dioxide or hydrogen chloride, and then to dry the carboxymethyl cellulose, for instance by heating it in a current of air. If a substantially pure product is required the caustic soda, instead of being neutralised, may be washed out of the crude carboxymethyl cellulose by means of an aqueous alcohol, for example aqueous methanol or ethanol of concentration about 75%–85%, at room temperature or at a higher temperature up to the boiling point of the alcohol.

The invention is illustrated by the following examples:

Example I

A purified wood pulp in sheet form was immersed for 1 hour in 23% aqueous caustic soda at 80° C. and was then pressed at 40–50 p. s. i. g. until the molecular ratio of caustic soda to cellulose (as determined by analysis) was 2.10 (wet/dry ratio 2.77).

The alkali cellulose so produced was broken up in a hammer mill and charged to a jacketed Werner-Pfleiderer mixer lined with stainless steel and having stainless steel blades, and was milled therein for about 2 hours at a temperature kept between 15° and 20° C. by passing chilled brine through the jacket. Chloracetic acid was then added in three stages at intervals of 90 minutes, 0.25 molecular proportion for each molecular proportion of cellulose in the mixture (as determined by the analysis of the alkali cellulose) being added at each stage; milling was continued throughout and for a further 7 hours after the final addition, and the temperature was kept between 15° and 20° C. until the end of the period, when it was allowed to rise to 22° C.

The product was discharged from the Werner-Pfleiderer mixer into a vat, where it was allowed to stand for 120 hours at about 20° C. Part was then thoroughly washed with 80% aqueous methanol and part was treated with carbon dioxide to neutralise residual caustic soda but was not otherwise purified. Both fractions dissolved substantially completely in water, 2% aqueous solutions having clarities 75% and 55% (water 100%) and viscosities at 20° C. 65 and 74 cps. respectively. The degree of substitution was 0.62 (i. e. 0.62 carboxymethyl groups were present for each anhydro-glucose unit of the cellulose); the products were fibrous in structure. The washed product contained about 96% of sodium carboxymethyl cellulose and 4% of sodium chloride, being substantially free from sodium carbonate and sodium glycollate.

Example II

A differential purified wood pulp was immersed for 1 hour in a 22% caustic soda solution at 80° C. and then pressed at 40 to 50 p. s. i. g. until the molecular ratio of caustic soda to cellulose was 2.22; the alkali cellulose so obtained was milled, first alone and then after adding chloracetic acid, under the conditions described in Example I. After subsequently standing for 120 hours, the fibrous product was washed free from alkali by means of 80% aqueous methanol and was then dissolved in water to give a 2% solution of clarity 66 and viscosity 111 cps. at 20° C. The degree of substitution was 0.41.

Example III

A purified wood pulp was given the treatment described in Example II, except that the alkali cellulose was milled for 7 hours at 50° C. and then cooled in the mixer to 15° C. before the addition of the chloracetic acid. During the whole of the subsequent milling the temperature was kept between 15° and 20° C. The washed product had a viscosity of about 4 cps. in 2% aqueous solution at 20° C.

It will be seen that by observing the conditions laid down in the present specification, it is possible to obtain a water-soluble carboxymethyl cellulose having very satisfactory properties, even though the amounts of the reactants employed are much lower than usual.

Having described our invention, what we desire to secure by Letters Patent is:

1. Process for the manufacture of carboxymethyl cellulose which comprises impregnating cellulose with caustic soda by immersing the cellulose in a caustic soda solution of concentration 15%–33% at a temperature above 50° C., subjecting the impregnated cellulose to pressure until the molecular ratio of caustic soda to cellulose, as determined by analysis, reckoning the cellulose as $C_6H_{10}O_5$, is between 2.0 and 3.1 mixing a compound selected from the group consisting of chloracetic acid and sodium chloracetate with the alkali cellulose so obtained, and milling the mixture at a temperature kept below 25° C.

2. Process for the manufacture of carboxymethyl cellulose which comprises impregnating cellulose with caustic soda by immersing the cellulose in a caustic soda solution of concentration 21%–26% at a temperature above 50° C., subjecting the impregnated cellulose to pressure until the molecular ratio of caustic soda to cellulose, as determined by analysis, reckoning the cellulose as $C_6H_{10}O_5$ is between 2.0 and 3.1, mixing a compound selected from the group consisting of chloracetic acid and sodium chloracetate with the alkali cellulose so obtained, and milling the mixture at a temperature kept below 25° C.

3. Process for the manufacture of carboxymethyl cellulose which comprises impregnating cellulose with caustic soda by immersing the cellulose in a caustic soda solution of concentration 21%–26% at a temperature of 75°–85° C., subjecting the impregnated cellulose to pressure until the molecular ratio of caustic soda to cellulose, as determined by analysis, reckoning the cellulose as $C_6H_{10}O_5$, is between 2.0 and 3.1, mixing a compound selected from the group consisting of chloracetic acid and sodium chloracetate with the alkali cellulose so obtained, and milling the mixture at a temperature kept below 25° C.

4. Process for the manufacture of carboxymethyl cellulose which comprises impregnating cellulose with caustic soda by immersing the cellulose in a caustic soda solution of concentration 21%–26% at a temperature of 75°–85° C., subjecting the impregnated cellulose to pressure until the molecular ratio of caustic soda to cellulose, as determined by analysis, reckoning the cellulose as $C_6H_{10}O_5$ is between 2.0 and 2.5, mixing a compound selected from the group consisting of chloracetic acid and sodium chloracetate with the alkali cellulose so obtained, and milling the mixture at a temperature kept below 25° C.

5. Process according to claim 4 wherein 0.75–1.25 molecular proportions of the compound selected from the group consisting of chloracetic acid and sodium chloracetate are employed for each molecular proportion of cellulose, reckoned as $C_6H_{10}O_5$.

6. Process according to claim 4 wherein 0.75–1.25 molecular proportions of the compound selected from the group consisting of chloracetic acid and sodium chloracetate are employed for each molecular proportion of cellulose, reckoned as $C_6H_{10}O_5$, wherein the milling is carried on for at least eight hours, and at the beginning and during the greater part of this time the temperature of the mixture is between 10° and 20° C.

7. Process for the manufacture of carboxymethyl cellulose which comprises impregnating cellulose with caustic soda by immersing the cellulose in a caustic soda solution of concentration 18%–30% at a temperature above 65° C., subjecting the impregnated cellulose to a light pressure until the molecular ratio of caustic soda to cellulose, as determined by analysis, reckoning the cellulose as $C_6H_{10}O_5$, is between 2.0 and 3.1 mixing chloracetic acid with the alkali cellulose so obtained, and milling the mixture at a temperature kept below 25° C.

8. Process for the manufacture of carboxymethyl cellulose which comprises impregnating cellulose with caustic soda by immersing the cellulose in a caustic soda solution of concentration 21%–26% at a temperature above 65° C., subjecting the impregnated cellulose to a light pressure until the molecular ratio of caustic soda to cellulose, as determined by analysis, reckoning the cellulose as $C_6H_{10}O_5$ is between 2.0 and 3.1, mixing chloracetic acid with the alkali cellulose so obtained, and milling the mixture at a temperature kept below 25° C.

9. Process for the manufacture of carboxymethyl cellulose which comprises impregnating cellulose with caustic soda by immersing the cellulose in a caustic soda solution of concentration 21%–26% at a temperature of 75°–85° C., subjecting the impregnated cellulose to a light pressure until the molecular ratio of caustic soda to cellulose, as determined by analysis, reckoning the cellulose as $C_6H_{10}O_5$, is between 2.0 and 3.1, mixing chloracetic acid with the alkali cellulose so obtained, and milling the mixture at a temperature kept below 25° C.

10. Process for the manufacture of carboxymethyl cellulose which comprises impregnating cellulose with caustic soda by immersing the cellulose in a caustic soda solution of concentration 21%–26% at a temperature of 75°–85° C., subjecting the impregnated cellulose to a light pressure until the molecular ratio of caustic soda to cellulose, as determined by analysis, reckoning the cellulose as $C_6H_{10}O_5$, is between 2.0 and 2.5, mixing chloracetic acid with the alkali cellulose so obtained, and milling the mixture at a temperature kept below 25° C.

11. Process according to claim 10 wherein 0.75–1.25 molecular proportions of the compound selected from the group consisting of chloracetic acid and sodium chloracetate are employed for each molecular proportion of cellulose, reckoned as $C_6H_{10}O_5$.

12. Process according to claim 10 wherein 0.75–1.25 molecular proportions of the compound selected from the group consisting of chloracetic acid and sodium chloracetate are employed for each molecular proportion of cellulose, reckoned as $C_6H_{10}O_5$, wherein the milling is carried on for at least eight hours, and at the beginning and during the greater part of this time the temperature of the mixture is between 10° and 20° C.

13. Process for the manufacture of carboxymethyl cellulose which comprises impregnating cellulose with caustic soda by immersing the cellulose in a caustic soda solution of a concentration 18%–30% at a temperature above 65° C., subjecting the impregnated cellulose to a light pressure until the molecular ratio of caustic soda to cellulose, as determined by analysis, reckoning the cellulose as $C_6H_{10}O_5$, is between 2.0 and 3.1, mixing chloracetic acid with the alkali cellulose so obtained in such quantity that the molecular ratio of the caustic soda in the alkali cellulose to the chloracetic acid is between 2:1 and 3:1.

14. Process according to claim 1 wherein the compound selected from the group consisting of chloracetic acid and sodium chloracetate is added in at least three stages during the milling operation.

15. Process according to claim 1 wherein the reactants are milled for 8 to 15 hours and are then allowed to stand for about 60 to 150 hours.

16. Process according to claim 1 wherein the reactants are agitated for about 15 to 50 hours.

17. Process according to claim 1 wherein the alkali cellulose is milled for at least one hour before the compound selected from the group consisting of chloracetic acid and sodium chloracetate is added thereto.

18. Process for the manufacture of carboxymethyl cellulose which comprises impregnating cellulose with caustic soda by immersing the cellulose in a caustic soda solution of a concentration 18%–30% at a temperature of 75°–85° C., subjecting the impregnated cellulose to a light pressure until the molecular ratio of caustic soda to cellulose, as determined by analysis, reckoning the cellulose as $C_6H_{10}O_5$, is between 2.0 and 3.1, mixing chloracetic acid with the alkali cellulose so obtained in such quantity that the molecular ratio of the caustic soda in the alkali cellulose to the chloracetic acid is between 2:1 and 3:1.

19. Process for the manufacture of carboxymethyl cellulose which comprises impregnating cellulose with caustic soda by immersing the cellulose in a caustic soda solution of a concentration 18–30% at a temperature of 75°–85° C., subjecting the impregnated cellulose to a light pressure until the molecular ratio of caustic soda to cellulose, as determined by analysis, reckoning the cellulose as $C_6H_{10}O_5$, is between 2.0 and 2.5, mixing chloracetic acid with the alkali cellulose so obtained in such quantity that the molecular ratio of the caustic soda in the alkali cellulose to the chloracetic acid is between 2:1 and 3:1.

20. Process according to claim 13 wherein 0.75–1.25 molecular proportions of the compound selected from the group consisting of chloracetic acid and sodium chloracetate are employed for each molecular proportion of cellulose, reckoned as $C_6H_{10}O_5$.

21. Process according to claim 13 wherein 0.75–1.25 molecular proportions of the compound selected from the group consisting of chloracetic acid and sodium chloracetate are employed for each molecular proportion of cellulose, reckoned as $C_6H_{10}O_5$, wherein the milling is carried on for at least eight hours, and at the beginning and during the greater part of this time the temperature of the mixture is between 10° and 20° C.

ARTHUR HODGE.
JAMES GORDON NAPIER DREWITT.
JOHN DOWNING.

References Cited in the file of this patent

UNITED STATES PATENTS

| Number | Name | Date |
|---|---|---|
| 1,682,292 | Lilienfeld | Aug. 28, 1928 |
| 2,101,263 | Maxwell | Dec. 7, 1937 |
| 2,149,310 | Peterson et al. | Mar. 7, 1939 |
| 2,362,900 | Groombridge et al. | Nov. 14, 1941 |
| 2,447,914 | Ruperti | Aug. 24, 1948 |
| 2,510,355 | Waldeck | June 6, 1950 |
| 2,524,024 | Swinehart et al. | Sept. 26, 1950 |